(12) United States Patent
Yan et al.

(10) Patent No.: US 9,373,146 B2
(45) Date of Patent: Jun. 21, 2016

(54) INFERRING TARGET CLUSTERS BASED ON SOCIAL CONNECTIONS

(71) Applicant: Facebook, Inc., Menlo Park, CA (US)

(72) Inventors: Rong Yan, Mountain View, CA (US); Ankush Singla, Sunnyvale, CA (US); Antonio Felipe Garcia-Martinez, Alameda, CA (US); Philip Anastasios Zigoris, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 339 days.

(21) Appl. No.: 13/625,633

(22) Filed: Sep. 24, 2012

(65) Prior Publication Data

US 2014/0089400 A1    Mar. 27, 2014

(51) Int. Cl.
*G06F 15/16* (2006.01)
*G06F 15/177* (2006.01)
*G06F 15/173* (2006.01)
*G06Q 50/00* (2012.01)
*G06Q 30/02* (2012.01)

(52) U.S. Cl.
CPC ............ *G06Q 50/01* (2013.01); *G06Q 30/0251* (2013.01)

(58) Field of Classification Search
CPC . G06Q 50/01; G06Q 30/022; G06Q 30/0241; G06Q 30/0251; G06Q 30/0255; G06Q 30/0277; G06Q 30/0254; H04L 67/306; H04L 67/22; H04L 51/32; H04L 12/588; H04L 12/185; H04W 4/206; H04W 52/0251; H04M 3/4878
USPC ......... 709/221, 224, 226, 201, 202, 203, 204, 709/205, 206, 207, 217, 218, 219, 220, 222, 709/227, 228, 229, 238–244
See application file for complete search history.

(56) References Cited

U.S. PATENT DOCUMENTS

| | | | | |
|---|---|---|---|---|
| 2008/0228537 | A1* | 9/2008 | Monfried | G06Q 30/0255 705/14.53 |
| 2008/0307052 | A1* | 12/2008 | Krishnan | G06Q 30/02 709/205 |
| 2010/0228614 | A1* | 9/2010 | Zhang | G06Q 10/10 705/14.16 |
| 2010/0312714 | A1 | 12/2010 | Ourega | |
| 2011/0004692 | A1* | 1/2011 | Occhino | H04L 67/22 709/228 |
| 2011/0208822 | A1* | 8/2011 | Rathod | G06Q 30/02 709/206 |

(Continued)

OTHER PUBLICATIONS

Wang, Xufei, et al. "Discovering overlapping groups in social media." Data Mining (ICDM), 2010 IEEE 10th International Conference on. IEEE, 2010. APA.*

(Continued)

*Primary Examiner* — Edward Kim
(74) *Attorney, Agent, or Firm* — Fenwick & West LLP (57) ABSTRACT

A seed cluster comprising a group of users who share a particular attribute and/or affiliation is determined by a social networking system. For each user of the seed cluster, other users and/or entities connected to the user in the social networking system are retrieved. For each retrieved other user or entity, the social networking system may determine whether the other user or entity exhibits the attribute or affiliation based on a random walk algorithm. A resulting targeting cluster of users and/or entities may be used for targeting advertisements targeting to members. A social networking system may also infer an affiliation for a user based on the user's interaction with a page, application, or entity where other users who interacted with the same page, application, or entity have the same affiliation.

26 Claims, 4 Drawing Sheets

(56) References Cited

U.S. PATENT DOCUMENTS

| | | | | |
|---|---|---|---|---|
| 2011/0225102 A1* | 9/2011 | Schleier-Smith | G06Q 30/02 | 705/319 |
| 2011/0276396 A1* | 11/2011 | Rathod | G06F 17/30867 | 705/14.49 |
| 2011/0314017 A1* | 12/2011 | Yariv | G06Q 30/02 | 707/737 |
| 2012/0059848 A1* | 3/2012 | Krishnamoorthy | G06Q 50/01 | 707/770 |
| 2012/0110071 A1* | 5/2012 | Zhou | G06Q 10/10 | 709/204 |
| 2012/0166285 A1* | 6/2012 | Shapiro | G06Q 30/0251 | 705/14.58 |
| 2012/0166540 A1* | 6/2012 | Reis | G06Q 30/0201 | 709/204 |
| 2012/0233256 A1* | 9/2012 | Shaham | G06F 17/30873 | 709/204 |

OTHER PUBLICATIONS

PCT International Search Report and Written Opinion, PCT Application No. PCT/US2013/052538, Nov. 18, 2013, thirteen pages.

* cited by examiner

INFERRING TARGET CLUSTERS BASED ON SOCIAL CONNECTIONS

BACKGROUND

This invention relates generally to social networking, and in particular to inferring target clusters of users based on social connections in a social networking system.

Traditional targeting criteria for advertising relies on demographic data and structured information, such as a user's self-declared interests and intentions to be marketable, i.e., to be in the market to purchase a product or service. Advertisers, in an effort to locate and target these users purchase analytical data gathered by third parties that track users visiting websites related to the advertiser's product. For example, websites on the Internet track people comparing car prices and filling out a form for a test drive at a local dealership and sell this information to advertisers. Advertisers may also target specific types of publishers or pages within a publisher's network in an effort to reach their intended audience (e.g., ads on Cars.com or the cars category on Yahoo to reach users who are believed to be in the market to buy a car.) But in the end, advertisers are limited to educated guessing at a user's intent to purchase or a user's interest in a particular subject matter.

In recent years, users of social networking systems have shared their interests, attributes, and affiliations, engaging with other users of the social networking systems by sharing photos, real-time status updates, and playing social games. The amount of information gathered from users is staggering—information describing recent moves to a new city, political preferences, causes, graduations, births, engagements, marriages, and the like. Entities may also declare attributes, affiliations, and other information, such as pages representing businesses, groups of users representing various organizations, and applications operating on social networking systems on behalf an entity. Users may also interact with these entities, providing more information about the users based on their interactions on the social networking systems. Social networking systems have been passively recording this information as part of the user experience, but social networking systems have lacked robust tools to use this information about users for targeting advertisements.

Specifically, the information available on social networking systems has not been used to define clusters of users of a social networking system that exhibit a particular attribute or have a particular affiliation, such as political party preference or interest in a niche topic such as "hipsters." Social networking systems have not provided advertisers with targeting clusters that utilize the information available about the users of the social networking systems.

SUMMARY

A seed cluster comprising a group of users who share a particular attribute and/or affiliation is determined by a social networking system. For each user of the seed cluster, a plurality of other users and/or entities connected to the user in the social networking system are retrieved. For each retrieved other user or entity, the social networking system may determine whether the other user or entity exhibits the attribute or affiliation. An explicit declaration of the other user or entity, an analysis of the connected users and/or entities of the retrieved other user or entity, and/or a random walk algorithm may be used to make this determination. As a result, the social networking system may determine one or more inferences that other users and/or entities exhibit the attribute or affiliation. The resulting targeting cluster of users and/or entities may be used for targeting advertisements targeting to members. The targeting cluster may be tested for accuracy using performance testing (e.g., measuring click-through rates of members in the targeting cluster for a particular advertisement and measuring negative feedback rates of members in the targeting cluster). A social networking system may also infer an affiliation for a user based on the user's interaction with a page, application, or entity where other users who interacted with the same page, application, or entity have the same affiliation.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, users can provide their age, gender, geographical location, education history, employment history and the like. The information provided by users may be used by the social networking system to direct information to the user. For example, the social networking system may recommend social groups, events, and potential friends to a user. The social networking system may also utilize user profile information to direct advertisements to the user, ensuring that only relevant advertisements are directed to the user. Relevant advertisements ensure that advertising spending reaches their intended audiences, rather than wasting shrinking resources on users that are likely to ignore the advertisement.

In addition to declarative information provided by users, social networking systems may also record users' actions on the social networking system. These actions include communications with other users, sharing photos, interactions with applications that operate on the social networking system, such as a social gaming application, responding to a poll, adding an interest, and joining an employee network. Information about users, such as stronger interests in particular users and applications than others based on their behavior, can be generated from these recorded actions through analysis and machine learning by the social networking system.

A social networking system may also attempt to infer information about its users. A social networking system may analyze large bursts of comments on a user's wall or status update from other users that include keywords such as "Congratulations" and "baby." Though largely unstructured, this information can be analyzed to infer life events that are happening to users on the social networking system.

Further, user profile information for a user is often not complete and may not even be completely accurate. Sometimes users deliberately provide incorrect information; for example, a user may provide incorrect age in the user profile. Users may also forget to update their information when it changes. For example, a user may move to a new location and forget to update the user's geographical location, or a user may change jobs but forget to update their workplace description in the user profile. As a result, a social networking system may infer certain profile attributes of a user, such as geographic location, educational institutions attended, and age range, by analyzing the user's connections and their declared profile information. Inferring profile attributes are further discussed in a related application, "Inferring User Profile Attributes from Social Information," U.S. application Ser. No. 12/916,322, filed Oct. 29, 2010, which is incorporated by reference in its entirety.

Reliable information about affiliations and attributes of users is very valuable to advertisers because users are more influenced by targeted advertisements that are relevant to their affiliations and attributes. For example, users who, politically, declare themselves as liberal are more susceptible to clicking on an advertisement for a petition for liberal causes. Meanwhile, advertisements that are not targeted based on attributes of users may have low click-through rates (CTRs) and/or conversions of advertisements provided to those users. Incorrectly targeted advertisements, which may include advertisements that are relevant to a particular attribute or affiliation but are not targeted to users that exhibit that attribute or affiliation, results in wasted advertising spend due to the ineffective advertising. However, some users may not declare their attributes and affiliations as part of their user profiles on a social networking system. As a result, targeting clusters based on these attributes and affiliations may be limited in size. A social networking system may infer affiliations and/or attributes of users by analyzing their social connections in the social networking system. Inferred affiliations and/or attributes may then be tested based on performance testing of advertisements targeted to the users based on the inferred affiliations and/or attributes.

Figure 1:
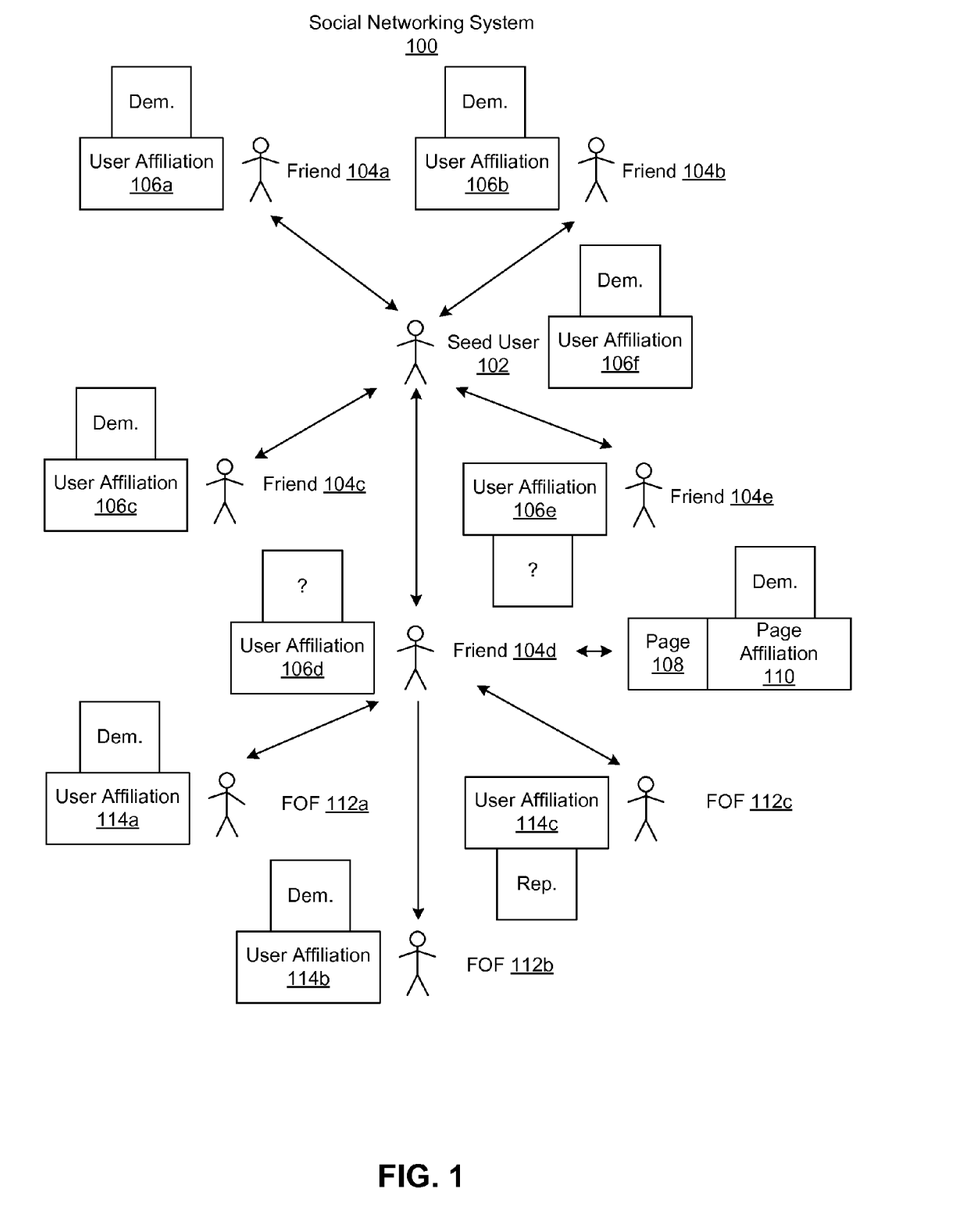
FIG. 1 is high level block diagram illustrating a process of inferring affiliations and/or attributes of users by analyzing their social connections in a social networking system, in accordance with an embodiment of the invention.

FIG. 1 illustrates a high-level block diagram of a process for inferring affiliations and/or attributes of users by analyzing their social connections in a social networking system, in one embodiment. A social networking system 100 may identify a seed cluster of users that have self-declared a particular attribute or affiliation. Included in the seed cluster is a seed user 102 that is connected to friends 104 in the social networking system 100, or other users of the social networking system 100. Each user of the social networking system 100 is associated with a user profile that includes declarative information shared by the user as well as any attributes and/or affiliations inferred by the social networking system 100. In one embodiment, explicit targeting clusters based on one or more attributes of users of the social networking system may be used as seed clusters. Methods of explicitly defining targeting clusters that have been tested for accuracy is further discussed in a related application, "Defining and Checking the Accuracy of Explicit Target Clusters in a Social Networking System," U.S. patent application Ser. No. 12/980,176, filed on Dec. 28, 2010, hereby incorporated by reference.

FIG. 1 and the other figures use like reference numerals to identify like elements. A letter after a reference numeral, such as "104a," indicates that the text refers specifically to the element having that particular reference numeral. A reference numeral in the text without a following letter, such as "104," refers to any or all of the elements in the figures bearing that reference numeral (e.g. "104" in the text refers to reference numerals "104a," "104b," and/or "104c" in the figures). Only five friends 104 of the seed user 102 are shown in FIG. 1 in order to simplify and clarify the description.

In one embodiment, all friends 104 of the seed user 102 in the social networking system 100, or other users connected to the seed user 102, are identified and analyzed by the social networking system 100 to determine a user affiliation 106 for each friend 104. In another embodiment, a subset of the connections of a seed user 102 on the social networking system 100 may be selected using a random walk method. The social networking system 100 may analyze the subset of the connections of a seed user 102 to determine unknown user affiliations 106 of the friends 104. A user affiliation 106 may be determined, as mentioned above, by an explicit declaration in a user profile, such as a user affiliation 106f of the seed user 102 that she is a Democrat. User affiliations 106 also may have been inferred by the social networking system 100. Some user affiliations 106 may not be known by the social networking system 100 as a result of the associated users not providing that information to the social networking system 100 in their user profiles. The social networking system 100, as a result of not having information about the user affiliations 106 of the friends 104, may infer those user affiliations 106 by analyzing other users connected to the friends 104.

For example, as illustrated in FIG. 1, a friend 104d connected to the seed user 102 and a friend 104e connected to the seed user 102 in the social networking system 100 have unknown user affiliations 106d and 106e. The social networking system 100 may have determined user affiliations 106a, 106b, and 106c for friends 104a, 104b, and 104c by retrieving user profiles for the friends 104a, 104b, and 104c on the social networking system 100, in one embodiment. In another embodiment, a user affiliation 106a may have been determined by the social networking system 100 by inference after analyzing other users connected to the friend 104a. User affiliation 106d may be determined by the social networking system 100 using similar methods.

As further illustrated in FIG. 1, the friend 104d connected to the seed user 102 is connected to other users and entities in the social networking system 100 that may be analyzed to infer the user affiliation 106d. The friend 104d is connected to friends of friend ("FOFs") 112a, 112b, and 112c as well as a page 108. The FOFs 112a and 112b have user affiliations 114a and 114b of Democrat ("Dem.") while the FOF 112c has a user affiliation 114c of Republican ("Rep."). The page 108 may have a page affiliation 110 determined by the social networking system 100 by analyzing users and entities connected to the page 108 in the social networking system 100 as well as interactions generated on the page 108 by the users and entities. Here, the page affiliation 110 of the page 108 is Democrat. In other embodiments, other entities, represented by applications, events, groups, and custom graph objects, connected to a seed user 102 and/or friends 104 in the social networking system 100, may have affiliations associated with them that may be used by the social networking system 100 in determining an inference.

The social networking system 100 may determine the user affiliation 106d of the friend 104d by determining the user affiliations 114 of the FOFs 112 as well as any page affiliations 110 of pages 108 connected to the friend 104d in the social networking system that are relevant to the determination of the user affiliation 106d. In one embodiment, the social networking system 100 may infer that the user affiliation 106d of the friend 104d is Democrat based on a simple majority of connections in the social networking system 100 being Democrat. In another embodiment, a scoring model may be used to determine the inference using affinity scores for the FOFs 112 of the friend 104d and the affinity score for the page 108 of the friend 104d as weights in the scoring model. In one embodiment, a scoring model may be a weighted average. In another embodiment, a scoring model may include various methods for predicting confidence scores using machine learning and/or regression analysis. In a further embodiment, a random walk method may be used to traverse a subset of all connections of a friend 104d to determine an inference of the user affiliation 106d of the friend 104d. The random walk method may be useful in sampling a large number of connections to determine the inference, in one embodiment.

Another method of determining an inference of a user affiliation 106e for a friend 104e may include inferring a particular affiliation based on a user's interaction with a page, application, or other entity in the social networking system 100 where other users that interacted with the page, application, or other entity have the particular affiliation. Similar to determining a user affiliation 106 for a friend 104, the social networking system 100 may also determine a page affiliation 110 for a page 108. A page 108 may represent an entity in the social networking system 100, such as a celebrity entertainer like Britney Spears, a cause such as VH1 Save the Music, or a business such as PepsiCola. A social networking system 100 may be able to assign a page affiliation 110 for a page 108 based on the user affiliations of users that interact with the page 108. For example, if a majority of users that interact regularly with a page 108 have a particular user affiliation, such as being a Democrat, then the page affiliation 110 may be assigned that particular user affiliation, in one embodiment. In other embodiments, other scoring models may be used in assigning the particular user affiliation as the page affiliation 110 for a page 108, including weighted scoring models and prediction models that rely on machine learning and regression analysis. Using the page affiliation 110 for a page 108, the social networking system 100 may determine inferences of user affiliations for users that have interacted with the page, in one embodiment. As a result of a friend 104e interacting with a page 108 for Britney Spears that may have been assigned a page affiliation 110 of Democrat, the user affiliation 106e for the friend 104e may be assigned Democrat, for example.

Other affiliations aside from political affiliations may be inferred by the social networking system 100, such as user characteristics, topics, interests, professions, hobbies, sports fans, causes, music genre fanatics, and so on. For example, each user of a seed cluster of users may indicate an interest, or a "like" for one or more pages for various marathons throughout the year. This may indicate that these users in the seed cluster have a shared user characteristic of being "athletic." Using the methods described above, the social networking system 100 may determine one or more inferences that other users connected to each user in the seed cluster may also share the user characteristic of being "athletic." The inferred users may then be grouped into targeting clusters for advertisements related to the London Olympics. If an inferred user, when presented with a targeted advertisement based on the inferred user characteristic of being athletic, indicates that the targeted advertisement is not relevant, not interesting, offensive, or otherwise provides negative feedback (e.g., by clicking on an 'X' in the advertisement), that information may be used in modifying the scoring model used to determine the inference. Starting with an explicit group of users, or seed cluster of users, the social networking system 100 may expand the group by inferring friends of members in the group using the methods described above.

Additionally, the social networking system 100 may infer an affiliation based on a user's interaction with a page, application, and/or entity where other users who interacted with the same page, application, and/or entity have that affiliation. For example, a user may interact frequently with a set of pages that may be related to being athletic, such as marathon pages, pages for sporting goods, and celebrity pages for sports figures. The level of interaction may vary, such as content posts, comments, sharing content, "liking" content, and page views. The social networking system 100 may determine that the majority of the users that also interact with the same pages also exhibit the user characteristic, or have otherwise been affiliated through explicit affiliation or inferred affiliation, of being athletic. As a result of the user's interactions with the same pages, the social networking system 100 may infer that the user is also athletic. In another embodiment, a scoring model may be used to determine an affiliation of a page or entity on the social networking system 100 based on an analysis of the users that like the page. For example, a correlation may be identified that links users that like country music, NASCAR racing, rodeos, and the Republican Party.

System Architecture

Figure 2:
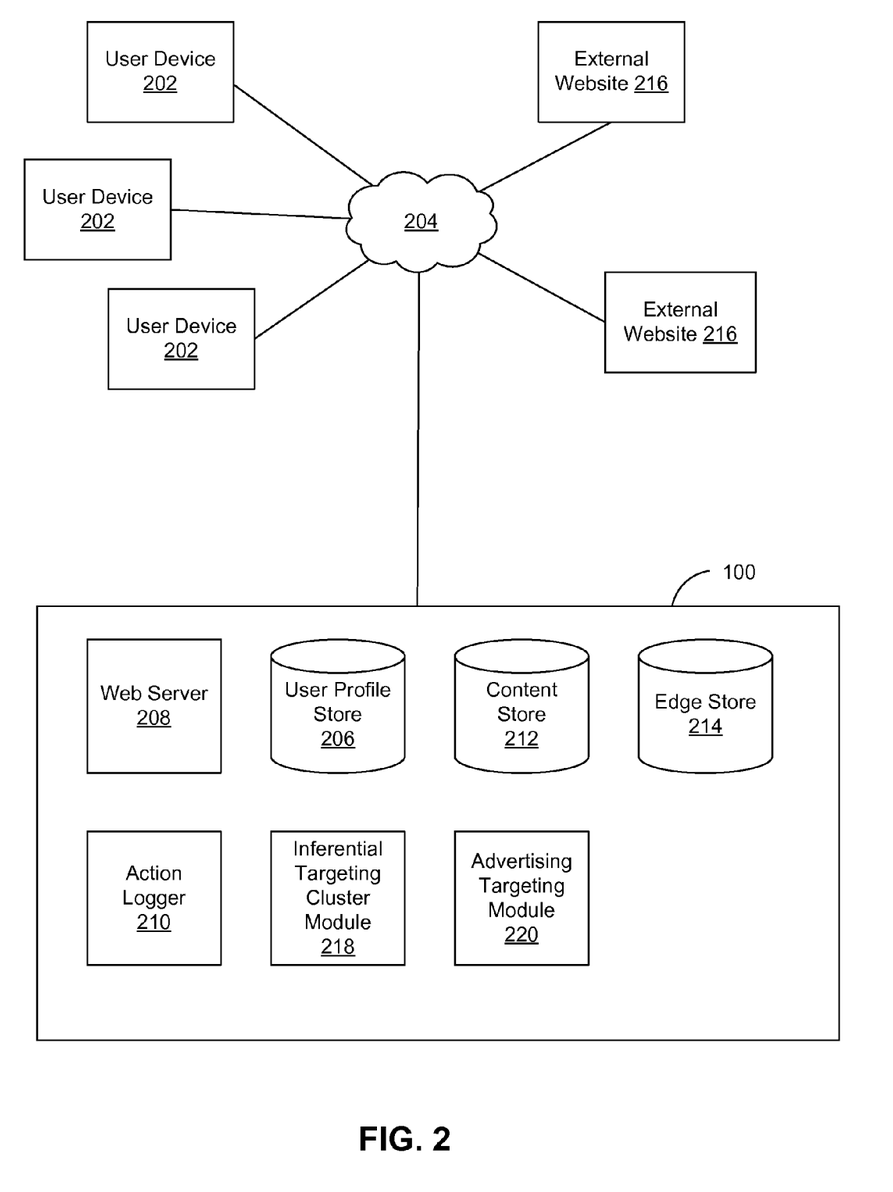
FIG. 2 is a network diagram of a system for inferring affiliations and/or attributes of users by analyzing their social connections in a social networking system, showing a block diagram of the social networking system, in accordance with an embodiment of the invention.

FIG. 2 is a high level block diagram illustrating a system environment suitable for inferring affiliations and/or attributes of users by analyzing their social connections in a social networking system, in accordance with an embodiment of the invention. The system environment comprises one or more user devices 202, the social networking system 100, external websites 216, and a network 204. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS and DROID.

In one embodiment, the network 204 uses standard communications technologies and/or protocols. Thus, the network 204 can include links using technologies such as Ethernet, 802.11, worldwide interoperability for microwave access (WiMAX), 3G, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, an action logger 210, a content store 212, an edge store 214, an inferential targeting cluster module 218, and an advertising targeting module 220. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native client device operating systems, such as iOS, DROID, webOS, and RIM.

The action logger 210 is capable of receiving communications from the web server 208 about user actions on and/or off the social networking system 100. The action logger 210 populates an action log with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

User account information and other related information for a user are stored in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. A user profile store 206 maintains profile information about users of the social networking system 100, such as age, gender, interests, geographic location, email addresses, credit card information, and other personalized information. The user profile store 206 also maintains references to the actions stored in the action log and performed on objects in the content store 212.

Although the system has access to the users' personal information, contained in the user profile store 206, the system preferably protects the users' information. For example, embodiments of the invention never include any personally identifiable information with the clusters. For example, even if email addresses were stored in the user profile store 206, the system may not build a cluster of users using their email address. In one embodiment, the system may build a cluster of users who have active credits tied to a credit card. Accordingly, while the system would avoid associating personally identifiable information with an individual user, it may aggregate this information at the cluster level.

The edge store 214 stores the information describing the connections between users. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed. The edge store 214 acts as a cross-referencing database for the user profile store 206 and the content store 212 to determine which objects are also being modified by connections of a user. Embodiments of the invention may also infer the relationship between two users (e.g., using an affinity algorithm) and use that for cluster building (e.g., by building a cluster of users whose close friends have upcoming birthdays next week, in which case the close friend would be identified using the coefficient value).

An inferential targeting cluster module 218 may define seed clusters of users for inferring affiliations of other users of the social networking system 100 connected to the users of the seed clusters. Information retrieved from user profile objects stored in the user profile store 206, content objects stored in the content store 212, and edge objects stored in the edge store 214 may be used in determining seed clusters of users having a particular affiliation. The affiliation may be selected by an advertiser in real time, through a targeting criteria selection user interface, or may be pre-selected by the social networking system 100 as an optimization. The users that have inferred affiliations then become part of the clusters of users to continue adding to the seed clusters. The inferential targeting cluster module 218 may also measure the performance of these clusters by analyzing user actions on advertisements that have been served to the clusters of users by the web server 208. Negative feedback, such as an "X-out" action that indicates the advertisement was repetitive, irrelevant, offensive, or otherwise objectionable to the viewing user, as well as positive feedback in the form of clicking through the advertisements may be used in measuring the performance of these clusters. User actions on the social networking system 100 are recorded by the action logger 210.

An advertising targeting module 220 may receive targeting criteria for advertisement requests from advertisers for targeting advertisements in the social networking system. Using inferential targeting clusters generated by the inferential targeting cluster module 218, a targeted advertisement on the social networking system 100 may be displayed on a user device 202 associated with a user of a targeting cluster of users for a particular affiliation, in one embodiment. Targeted advertisements may be distributed by the advertising targeting module 220 to inferential targeting clusters of users of the social networking system 100, such as banner advertisements, social endorsements of an affiliation or user characteristic, sponsored stories highlighting user-generated stories related to an affiliation, and so forth.

Generating Inferential Targeting Clusters

Figure 3:
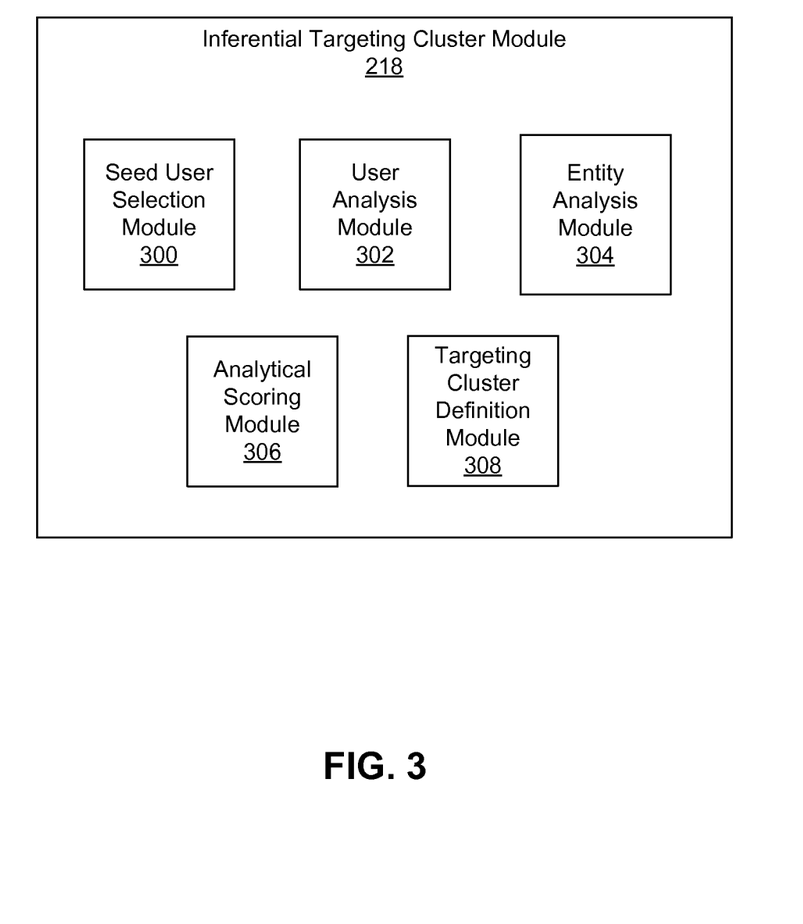
FIG. 3 is high level block diagram illustrating an inferential targeting cluster module that includes various modules for analyzing social connections in a social networking system to infer affiliations of users, in accordance with an embodiment of the invention.

FIG. 3 illustrates a high level block diagram of the inferential targeting cluster module 218 in further detail, in one embodiment. The inferential targeting cluster module 218 includes a seed user selection module 300, a user analysis module 302, an entity analysis module 304, an analytical scoring module 306, and a targeting cluster definition module 308. These modules may perform in conjunction with each other or independently to generate inferential targeting clusters for affiliations, interests, and/or characteristics of users of the social networking system 100.

A seed user selection module 300 gathers information about potential seed users of the social networking system 100 to generate a seed cluster of users that share a selected affiliation, interest, or characteristic. In one embodiment, the seed user selection module 300 selects users that have made the selected affiliation, interest, or characteristic explicit on their user profiles. For example, if the selected affiliation was a "San Francisco Giants Fan," seed users may be determined based on an explicit affiliation by the seed users, such as being a "fan" of the San Francisco Giants page in the social networking system 100, listing the sports team as a favorite sports team in the users' profile page, and so forth. Other information may be gathered by the seed user selection module 300, including edge objects and content objects related to the selected affiliation, interest, or characteristic. Continuing the example, content objects and edge objects related to the selected affiliation, interest, and/or characteristic, such as check-in events, status update mentions, photo and video tags, likes on other pages related to the selected affiliation, and user interactions with content items such as posts, comments, likes, and shares may be retrieved for determining whether a user may be selected as a seed user in the seed cluster of users sharing the selected affiliation, interest, or characteristic.

A user analysis module 302 performs an analysis of other users connected to a seed user in the seed cluster of users to identify additional users that may share the affiliation with the seed user. As illustrated in FIG. 1, other users connected to a seed user in the seed cluster may or may not have the selected affiliation determined by the social networking system 100. For those other users connected to the seed user that do not have the selected affiliation determined, the user analysis module 302 may perform an analysis on those other users to determine whether they share the affiliation with the seed user. The user analysis module 302 may determine that connected users to a seed user in the seed cluster of users have unknown affiliations. Further user analysis would be required by the user analysis module 302 in that case, such as retrieving secondary connections, or users that are connected to the connected users that have unknown affiliations. The retrieved secondary connections are then analyzed by the user analysis module 302 to determine how many of those secondary connections share the affiliation with the seed user. A user may be analyzed for the selected affiliation based on the user's profile (i.e., self-declared) or may be inferred to have the selected affiliation based on an analysis of edge objects and content objects related to the selected affiliation and the user, and/or a scoring model used to predict whether the user shares the selected affiliation.

An entity analysis module 304 determines an analysis of connections of an entity, such as a page or application, on the social networking system 100 with respect to a selected affiliation. For example, users that have explicitly associated themselves, or affiliated themselves, with the Republican Party may comprise the majority of users that interact with an application that enables users to find the closest Land Rover dealership, which sells relatively large SUVs. The entity analysis module 304 may analyze the connections of an entity, such as the users that have interacted with an application for finding the closest Land Rover dealership, and determine what affiliations, if any, may be inferred about users that interact with the application. In this case, because a majority of users that use the Land Rover application are explicitly affiliated with the Republican Party, the entity analysis module 304 may determine that the application may have an affiliation with the Republican Party such that users that interact with the application may be determined to also be affiliated with the Republican Party. In other embodiments, other types of interactions with entities or a series of disparate interactions may be analyzed by the entity analysis module 304. For example, the entity analysis module 304 may limit analysis of connected users to those users that have installed the application, have frequently used the application over a given time period (by meeting a predetermined threshold number of uses), and have invited other users to install the application. In this way, the quality of interaction with the entity may be used to identify a particular affiliation that may be inferred to users that have performed the specific type(s) of interactions with the entity.

An analytical scoring module 306 determines an analytical score for analyzing connections of a user or a page in determining whether an affiliation should be inferred for the user or the page. A scoring algorithm or scoring model may be used by the analytical scoring module 306 to determine an analytical score for a page or a user based on the page's connections or the user's connections on the social networking system 100. In one embodiment, the scoring model may determine whether a majority of the user's connections exhibit the affiliation explicitly or by inference. In another embodiment, other factors may be included in the scoring model, such as using the affinity scores of the user for the user's connections as weights in a weighted average of the user's connections exhibiting the affiliation. For example, a user that has several weak connections on the social networking system 100 that have self-identified as Republicans may have less weight attributed to them than other connections that are self-identified as Democrats that have stronger connections to the user as reflected by higher affinity scores.

A targeting cluster definition module 308 generates a targeting cluster of users that share a particular affiliation. The targeting cluster may be used for targeting advertisements, in one embodiment. In another embodiment, the targeting cluster may be used for various optimizations in the social networking system 100, such as targeting content items in a news feed to users based on their affiliations. In a further embodiment, a targeting cluster definition module 308 may generate a targeting cluster of users that share one or more affiliations. For example, through analysis of affiliation information generated by the inferential targeting cluster module 218, a strong correlation may be determined for users affiliated with country music also being affiliated with the Republican Party. As a result, the targeting cluster definition module 308 may determine that a target cluster definition for users affiliated with the Republican Party may include users that are affiliated with country music. In other embodiments, only affiliations with certain country music artists, such as Toby Keith and Hank Williams, may be strongly correlated with the being affiliated with the Republican Party. Other country music artists, such as the Dixie Chicks, may be more affiliated with the Democrats, for example.

Figure 4:
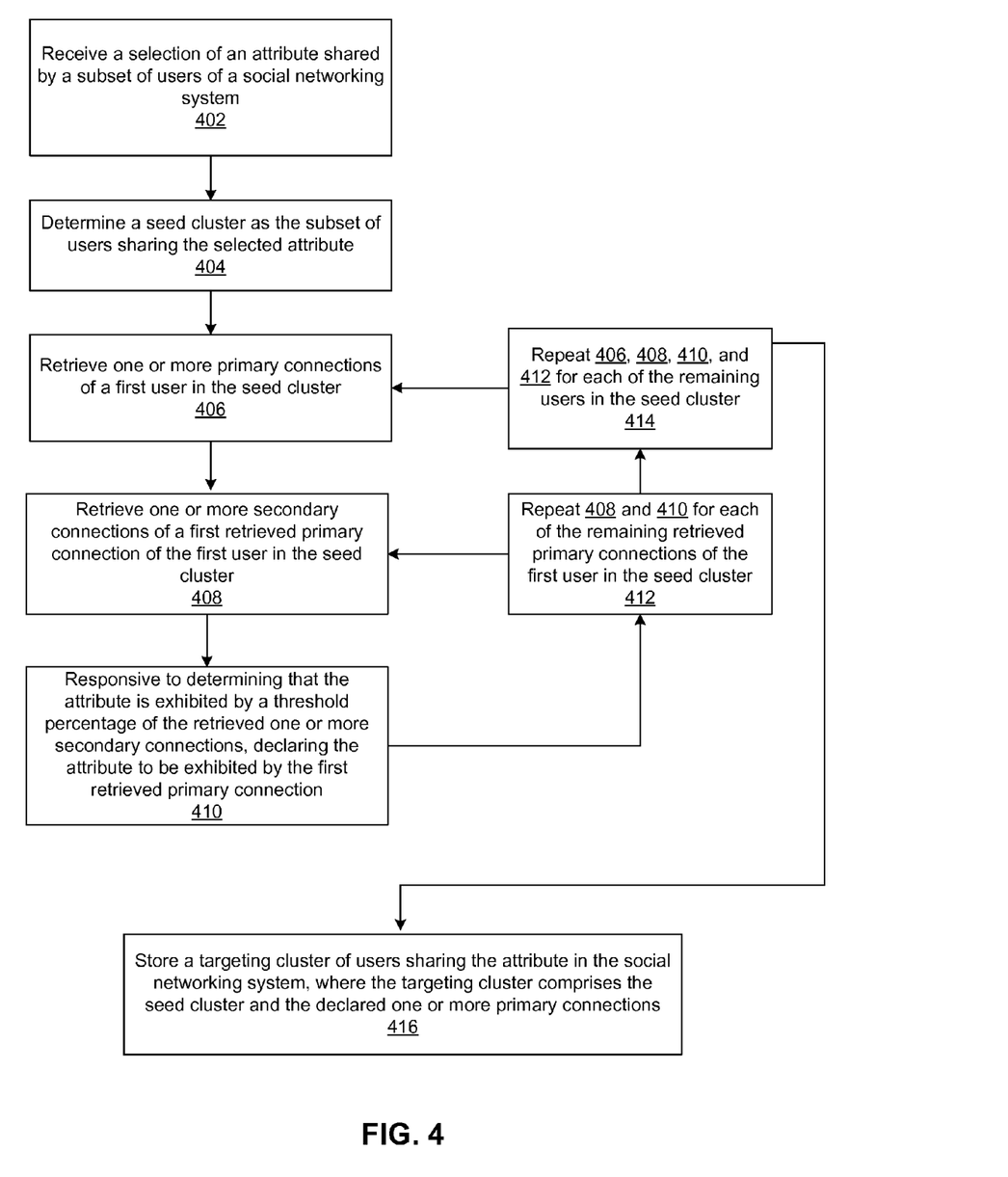
FIG. 4 is a flowchart diagram depicting a process of inferring affiliations and/or attributes of users by analyzing social connections in a social networking system, in accordance with an embodiment of the invention.

FIG. 4 illustrates a flow chart diagram depicting a process of inferring affiliations and/or attributes of users and/or entities by analyzing social connections in a social networking system, in accordance with an embodiment of the invention. A selection of an attribute shared by a subset of users of a social networking system is received 402. The attribute, or affiliation, may be selected by an advertiser selecting targeting criteria for an ad request received 402 by the social networking system 100, in one embodiment. In another embodiment, the attribute may be received 402 from another module in the social networking system 100 for optimizing another social networking system product, such as the news feed rankings of content items.

Once the selection of an attribute is received 402, a seed cluster is determined 404 as the subset of users sharing the selected attribute. In one embodiment, the seed cluster is determined 404 by retrieving the user profile objects of users that have explicitly stated the selected attribute in their user profiles, or self-identified as having the selected attribute or affiliation. In another embodiment, a seed cluster may be determined 404 to include users that have been previously inferred to have the selected attribute or affiliation.

After the seed cluster has been determined 404 as the subset of users sharing the selected attribute, one or more primary connections of a first user in the seed cluster are retrieved 406. The social networking system 100 may use the seed cluster of users to identify primary connections that may have the selected attribute or affiliation. Here, primary connections may include users and non-users, such as entities, pages, and/or applications. Primary connections may be retrieved 406 by accessing the first user's user profile object in the social networking system 100, in one embodiment. In another embodiment, edge objects associated with the first user may be accessed to retrieve 406 the primary connections of the first user in the social networking system 100.

Next, one or more secondary connections of the first retrieved primary connection of the first user in the seed cluster is retrieved 408. The first retrieved primary connection of the first user in the seed cluster may be a user or a non-user, such as an entity, a page, or an application. Secondary connections may also be users and/or non-users of the social networking system 100. Similar to step 406, secondary connections may be retrieved 408 by accessing the first retrieved primary connection's user profile object, page object, or application object to retrieve 408 the secondary connections or by accessing edge objects connected to the object representing the first retrieved primary connection in the social networking system 100.

Responsive to determining that the attribute is exhibited by a threshold percentage of the retrieved one or more secondary connections, the social networking system may declare 410 that the attribute is exhibited by the first retrieved primary connection. The threshold percentage may be predetermined, in one embodiment. In another embodiment, the threshold percentage may be any percentage over 50%. In a further embodiment, the threshold percentage may be any percentage over 80%. The social networking system 100 may declare 410 that the attribute is exhibited by the first retrieved primary connection by associating the attribute with a user profile object, a page object, or an application object for the primary connection in the social networking system 100.

The determination that the attribute is exhibited by a threshold percentage of the retrieved one or more secondary connections may be made responsive to applying a business logic rule to the one or more secondary connections, in one embodiment. Other business logic rules may be used to satisfy the determination that acts as a precondition to the social networking system declaring 410 that the attribute is exhibited by the first retrieved primary connection. In one embodiment, a business logic rule may analyze a subset of the one or more secondary connections based on affinity scores of the first retrieved primary connection for the subset of the one or more secondary connections. The social networking system may determine whether a majority that subset of secondary connections exhibit the attribute. In another embodiment, the social networking system may determine whether a predetermined threshold percentage of the subset of secondary connections exhibit the attribute. In other embodiments, different business logic rules may be used to establish a precondition before declaring 410 that the attribute is exhibited by the first retrieved primary connection. For example, different affiliations may be attributed to predicting a particular political affiliation, such as country music fans and NASCAR fans being more affiliated with the Republican Party. As a result, business logic rules may be used to implement these different affiliations into a precondition that is met for retrieved secondary connections before declaring 410 the attribute is exhibited by the first retrieved primary connection.

Steps 408 and 410 are repeated 412 for each of the remaining retrieved primary connections of the first user in the seed cluster. Steps 406, 408, 410 are repeated 414 for each of the remaining users in the seed cluster. A targeting cluster of users sharing the attribute is stored 416 in the social networking system, where the targeting cluster comprises the seed cluster and the declared one or more primary connections. In one embodiment, where a connection of the declared one or more primary connections is a particular user of the social networking system, the targeting cluster of users includes identifying information about that particular user. In another embodiment, where a connection of the declared one or more primary connections is a non-user entity of the social networking system, the targeting cluster may include identifying information of the non-user entity in the social networking system such that users that interact with the non-user entity may be identified as possible users to target.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving a selection of an attribute shared by a subset of users of an online social networking system;
    determining a seed cluster comprising the subset of users sharing the selected attribute;
    retrieving a primary connection of a seed user from the seed cluster, the primary connection connected to the seed user in the online social networking system;
    determining from stored information about the primary connection whether the retrieved primary connection exhibits the selected attribute;
    responsive to a determination that the retrieved primary connection does not exhibit the selected attribute, retrieving a plurality of secondary connections of the seed user in the online social networking system;
    determining that one or more of the plurality of secondary connections exhibit the selected attribute;
    responsive to a determination that a threshold number of the one or more secondary connections exhibit the selected attribute, inferring, by a processor, that the retrieved primary connection exhibits the selected attribute;
    updating the stored information to associate the selected attribute with the retrieved primary connection that was determined to not be exhibited by the primary connection; and
    storing information defining a targeting cluster of users as users of the online social networking system who share the selected attribute, where the targeting cluster comprises the seed cluster of users and the primary connection associated with the selected attribute.

2. The method of claim 1, wherein receiving a selection of an attribute shared by a subset of users of an online social networking system further comprises receiving the selection from an advertiser selecting targeting criteria for an ad request.

3. The method of claim 1, wherein receiving a selection of an attribute shared by a subset of users of an online social networking system further comprises receiving the selection from a module in the online social networking system.

4. The method of claim 1, wherein determining a seed cluster comprises adding users to the seed cluster based on an inference related to the selected attribute.

5. The method of claim 4, wherein adding users to the cluster based on an inference related to the selected attribute comprises adding an inferred user based on retrieved profile information of users connected to the inferred user.

6. The method of claim 1, wherein the subset of users sharing the selected attribute comprises users of the online social networking system who have recently used a specified application on the online social networking system.

7. The method of claim 1, wherein determining a seed cluster comprises adding users to the seed cluster based on profile information relating to the selected attribute.

8. The method of claim 1, wherein determining a seed cluster comprises adding users to the seed cluster based on content information related to the selected attribute.

9. The method of claim 1, wherein determining that one or more secondary connections exhibit the selected attribute further comprises:
    for each secondary connection in a subset of the one or more secondary connections comprising a subset of users of the online social networking system, determining that the secondary connection exhibits the selected attribute based on the user profile of the secondary connection comprising the selected attribute.

10. The method of claim 1, wherein inferring that the retrieved primary connection exhibits the selected attribute based on the determined one or more secondary connections exhibiting the selected attribute further comprises:
    determining a percentage of total secondary connections exhibiting the selected attribute based on the determined one or more secondary connections compared to the retrieved one or more secondary connections connected to the retrieved primary connection in the online social networking system; and
    responsive to the determined percentage exceeding a predetermined threshold percentage, inferring that the retrieved primary connection exhibits the selected attribute.

11. The method of claim 10, wherein the predetermined threshold percentage comprises at least eighty percent.

12. The method of claim 1, wherein inferring that the retrieved primary connection exhibits the selected attribute based on the determined one or more secondary connections exhibiting the selected attribute further comprises:
    determining a weighted average using a plurality of affinity scores of the retrieved primary connection for the determined one or more secondary connections as weights; and
    responsive to the determined weighted average exceeding a predetermined threshold, inferring that the retrieved primary connection exhibits the selected attribute.

13. The method of claim 1, wherein the predetermined criteria comprises at least a predetermined threshold percentage of one or more secondary connections exhibiting the selected attribute.

14. A non-transitory computer readable storage medium storing one or more programs configured to be executed by a server system, the one or more programs comprising instructions for:
    receiving a selection of an attribute shared by a subset of users of an online social networking system;
    determining a seed cluster comprising the subset of users sharing the selected attribute;

retrieving a primary connection of a seed user from the seed cluster, the primary connection connected to the seed user in the online social networking system;

determining from stored information about the primary connection whether the retrieved primary connection exhibits the selected attribute;

responsive to a determination that the retrieved primary connection does not exhibit the selected attribute, retrieving a plurality of secondary connections of the seed user in the online social networking system;

determining that one or more of the plurality of secondary connections exhibit the selected attribute;

responsive to a determination that a threshold number of the one or more secondary connections exhibit the selected attribute, inferring, by a processor, that the retrieved primary connection exhibits the selected attribute;

updating the stored information to associate the selected attribute with the retrieved primary connection that was determined to not be exhibited by the primary connection; and storing information defining a targeting cluster of users as users of the online social networking system who share the selected attribute, where the targeting cluster comprises the seed cluster of users and the primary connection associated with the selected attribute.

15. The non-transitory computer readable storage medium of claim 14, wherein receiving a selection of an attribute shared by a subset of users of an online social networking system further comprises receiving the selection from an advertiser selecting targeting criteria for an ad request.

16. The non-transitory computer readable storage medium of claim 14, wherein receiving a selection of an attribute shared by a subset of users of an online social networking system further comprises receiving the selection from a module in the online social networking system.

17. The non-transitory computer readable storage medium of claim 14, wherein determining a seed cluster comprises adding users to the seed cluster based on an inference related to the selected attribute.

18. The non-transitory computer readable storage medium of claim 17, wherein adding users to the cluster based on an inference related to the selected attribute comprises adding an inferred user based on retrieved profile information of users connected to the inferred user.

19. The non-transitory computer readable storage medium of claim 14, wherein the subset of users sharing the selected attribute comprises users of the online social networking system who have recently used a specified application on the online social networking system.

20. The non-transitory computer readable storage medium of claim 14, wherein determining a seed cluster comprises adding users to the seed cluster based on profile information relating to the selected attribute.

21. The non-transitory computer readable storage medium of claim 14, wherein determining a seed cluster comprises adding users to the seed cluster based on content information related to the selected attribute.

22. The non-transitory computer readable storage medium of claim 14, wherein determining that one or more secondary connections exhibit the selected attribute further comprises:

for each secondary connection in a subset of the one or more secondary connections comprising a subset of users of the online social networking system, determining that the secondary connection exhibits the selected attribute based on the user profile of the secondary connection comprising the selected attribute.

23. The non-transitory computer readable storage medium of claim 14, wherein inferring that the retrieved primary connection exhibits the selected attribute based on the determined one or more secondary connections exhibiting the selected attribute further comprises:

determining a percentage of total secondary connections exhibiting the selected attribute based on the determined one or more secondary connections compared to the retrieved one or more secondary connections connected to the retrieved primary connection in the online social networking system; and responsive to the determined percentage exceeding a predetermined threshold percentage, inferring that the retrieved primary connection exhibits the selected attribute.

24. The non-transitory computer readable storage medium of claim 23, wherein the predetermined threshold percentage comprises at least eighty percent.

25. The non-transitory computer readable storage medium of claim 14, wherein inferring that the retrieved primary connection exhibits the selected attribute based on the determined one or more secondary connections exhibiting the selected attribute further comprises:

determining a weighted average using a plurality of affinity scores of the retrieved primary connection for the determined one or more secondary connections as weights; and responsive to the determined weighted average exceeding a predetermined threshold, inferring that the retrieved primary connection exhibits the selected attribute.

26. The non-transitory computer readable storage medium of claim 14, wherein the predetermined criteria comprises at least a predetermined threshold percentage of one or more secondary connections exhibiting the selected attribute.

* * * * *